United States Patent [19]
Barker et al.

[11] Patent Number: 5,325,669
[45] Date of Patent: Jul. 5, 1994

[54] LOW BREAKOUT HYDRAULIC POWER TRANSFER UNIT AND METHOD OF OPERATION THEREOF

[75] Inventors: Brian P. Barker, Ventura; James L. Coakley, Fillmore, both of Calif.

[73] Assignee: Pneumo Abex Corporation, Oxnard, Calif.

[21] Appl. No.: 918,467

[22] Filed: Jul. 22, 1992

[51] Int. Cl.⁵ .............................................. F16D 31/02
[52] U.S. Cl. ........................................ 60/428; 60/487; 60/494; 91/444
[58] Field of Search .................. 60/421, 428, 429, 487, 60/489, 493, 454, 564, 445; 91/444, 446, 448

[56] References Cited

U.S. PATENT DOCUMENTS

| | | | |
|---|---|---|---|
| 3,230,699 | 1/1966 | Hann et al. | 60/464 |
| 3,691,767 | 2/1972 | Cakley | 60/445 |
| 3,699,677 | 10/1972 | Asmus | 60/489 X |
| 3,927,527 | 12/1975 | Engel | 60/487 X |
| 4,132,072 | 1/1979 | Schlinke | 60/487 X |
| 4,258,548 | 3/1981 | Hall et al. | 60/487 X |
| 5,101,925 | 4/1992 | Walker | 60/487 X |

FOREIGN PATENT DOCUMENTS 4000801  2/1991  Fed. Rep. of Germany ........ 60/464

Primary Examiner—Edward K. Look
Assistant Examiner—Hoang Nguyen
Attorney, Agent, or Firm—Trask, Britt & Rossa

[57] ABSTRACT

A low breakout power transfer unit for transferring power between first and second hydraulic systems includes first and second pump/motor units to allow fluid flow between the first and second pump/motor units and the first and second hydraulic systems, respectively. The transfer unit includes a detection device for sensing fluid flow demand in the hydraulic systems and values for automatically isolating the pump/motor units from the hydraulic systems when the detection means senses substantially no fluid flow demands in a hydraulic system. The transfer unit includes a bypass device for each pump/motor unit for recirculating pumped fluid in excess of fluid flow demand.

17 Claims, 4 Drawing Sheets

LOW BREAKOUT HYDRAULIC POWER TRANSFER UNIT AND METHOD OF OPERATION THEREOF

BACKGROUND OF THE INVENTION

1. Field

The invention is in the field of hydraulic motors and pumps. More particularly, the invention relates to hydraulic power transfer units which utilize pressure-sensing, fluid flow-limiting and fluid flow bypassing techniques and mechanisms and their operation.

2. State of the Art

Hydraulic power transfer units are commonly used to provide emergency or assistive power from one aircraft hydraulic system to another aircraft hydraulic system. A power transfer unit typically consists of two back-to-back pump/motor units with a common drive shaft, which are connected to different hydraulic systems which may or may not have equivalent working pressures. Each pump/motor unit operates exclusively with hydraulic fluid from the system to which it is connected such that there is no intermixing of hydraulic fluid between systems. Typically, each pump/motor unit contains a hydraulic axial piston pump/motor, or "rotating group" as it is commonly referred to by those skilled in the art.

For convenience, the following discussion is based on systems with equivalent working pressures. If there is a system pressure drop in one system, a differential pressure develops across the power transfer unit and the rotating groups commence rotating or "breakout" to supply power to the lower pressure system. The rotating group which accesses the higher pressure system will act as a motor to rotate the common shaft which drives the rotating group which accesses the lower pressure system as a pump. The power transfer unit will continue to supply power to the lower pressure system until the flow demand to the lower pressure system ceases, the system pressure returns to the rated working pressure and there is no longer an unbalancing differential pressure across the power transfer unit.

Non-bypassing and non-flow-limiting power transfer units are the simplest of power transfer units in that the rotating group which acts as a pump is in direct communication with the hydraulic system with no intermediate valving, such as check or flow limiter valves. Typically, rated or working pressure applied to each side of the power transfer unit will cause the rotating groups to remain in a stalled, or non-rotating state.

When the pressure drops in one system due to a fluid flow demand, the differential pressure between the motor inlet in the high pressure system and the pump outlet in the lower pressure system creates a torque which must exceed the breakout threshold torque of the power transfer unit before the rotating groups will commence rotating. At the breakout threshold, the torque due to differential pressure across the power transfer unit equals the resistive torque due to the static friction of the power transfer unit. Once running, the torque efficiency increases quickly, allowing the rotating groups to accelerate to speed.

With most conventional power transfer units, the high breakout torque characteristics cause the pressure in one system to fall to unacceptably low levels until the power transfer unit breakout threshold is exceeded and the rotating groups begin rotating. Once running, the power transfer unit will provide pressure and fluid flow to the low pressure system until the flow demand falls, and the running torque due to differential pressure across the unit is less than the stall torque threshold, at which point the rotating groups stall and cease rotating. At some low average fluid flow demand rate greater than zero, the power transfer unit will be unable to deliver fluid flow smoothly, and the rotating groups will alternate between stalling and restarting.

One method used in the prior art to avoid the undesirable system pressure fall-off prior to breakout and the undesirable alternative stalling and restarting of the rotating groups with decreasing fluid flow demand and to provide the ability to run smoothly down to zero flow, is the use of internal flow bypassing. Internal flow bypassing avoids power transfer unit stalling under low fluid flow demand by internally diverting a portion of the pump outlet fluid flow into the case or return system, maintaining a fluid flow demand on the rotating group greater than that at which stall occurs. When fluid flow is demanded, the power transfer unit need not overcome the breakout torque since the rotating groups are already rotating. Smooth fluid flow delivery can begin with very little drop in system pressure.

The disadvantage of internal flow bypassing is the consumption of hydraulic power to maintain rotation of the rotating groups at the zero fluid flow condition where no useful work is produced and overall efficiency is zero. This loss is realized as a wasted power draw from the main hydraulic pump, which in aircraft applications is driven by the aircraft engine, and results in undesirable heat rejection into the hydraulic system. When an aircraft is in flight, a power transfer unit typically delivers fluid flow only in the event of an emergency drop in hydraulic pressure or intermittently to provide extra fluid flow during peak system usage. Therefore, unless externally isolated, the rotating groups spend the majority of in-flight operation rotating in the zero fluid flow standby condition due to internal flow bypassing. Over time, the energy and aircraft fuel required for internal flow bypassing can be considerable.

Since the rotating groups of a power transfer unit are not rotationally restrained, the potential for damage to the power transfer unit from overspeed of the rotating groups exists. Overspeed of the rotating groups may occur as a result of a loss of hydraulic load on the pump side of the power transfer unit due to breech-type structural failures in the high-pressure system allowing loss of fluid, or if the power transfer unit drive shaft shears. In addition to possible damage to the power transfer unit, overspeed of the rotating groups could result in a relatively huge consumption of fluid flow by the motor side of the power transfer unit that could exceed the fluid flow capability of the main hydraulic pump, resulting in an unacceptable loss of pressure in that system.

In the prior art, flow limiting valves have been incorporated at the motor inlet side of the power transfer unit to limit the fluid flow consumption of the power transfer unit. The flow limiting valve acts to restrict fluid flow into the motor inlet once the fluid flow has attained a specified value. Fluid flow rate through the flow limiting valve is sensed as a function of differential pressure across an entrance orifice into the flow limiting valve. If the fluid flow increases beyond a specified value, a piston in the flow limiting valve overcomes a spring having a pre-set tension and closes a metering orifice downstream of the entrance orifice. The differential pressure developed across the closing metering orifice lowers the pressure acting across the motor and limits the rotating group speed to an acceptable value.

BRIEF SUMMARY OF THE INVENTION

1. Objectives

An objective of the invention is to achieve reduced "breakout" system differential pressure in a power transfer unit without continuous internal flow bypassing when the power transfer unit is in the standby state. Another objective is to supply fluid flow on demand to either hydraulic system connected to a power transfer unit without a large drop in pressure in either hydraulic system. Another objective is to provide a power transfer unit that delivers fluid flow smoothly until the fluid flow demand ceases, avoiding stalling of the rotational groups prior to zero fluid flow. A final objective is to provide a power transfer unit that hydromechanically isolates itself from both hydraulic systems when in the standby condition.

2. Features

Disclosed is a power transfer unit for transferring power between two hydraulic systems, comprising a pump/motor unit that is associated with a hydraulic system to allow fluid flow between the pump/motor unit and the hydraulic system; a second pump/motor unit that is associated with a second hydraulic system to allow fluid flow between the second pump/motor unit and the second hydraulic system, the second pump/motor unit being driveably connected to the pump/motor unit; a detection means for sensing a fluid flow demand in the hydraulic systems; a valve means for isolating fluid pressure within the pump/motor unit from the hydraulic system and a second valve means for isolating fluid pressure within the second pump/motor unit from the second hydraulic system, when the detection means senses substantially no fluid flow demand in the hydraulic system and second hydraulic system; a mode means for commanding, when the detection means senses a flow demand in, for example, the second hydraulic system, the valve means to access the pump/motor unit to the hydraulic system thereby causing the pump/motor unit to commence rotating and function as a motor to drive the second pump/motor unit as a pump; a delay means for delaying the opening of the second valve means to access the second pump/motor unit to the second hydraulic system until after the second pump/motor unit is rotating and functioning as a pump with pressure substantially equal to or greater than that of the second hydraulic system; and a bypass means for bypassing flow from the second pump/motor unit, when the second pump/motor unit is functioning as a pump, to achieve smooth fluid flow delivery from the second pump/motor unit to the second hydraulic system as the fluid flow demand in the second hydraulic system decreases to zero. The inherent internal fluid leakage characteristics of the pump/motor unit and the second pump/motor unit will quickly result in depressurization and unloading of the pump/motor unit and the second pump/motor unit when they are isolated from the hydraulic system and second hydraulic system, respectively. However, to achieve even quicker depressurization and unloading, it is possible to provide a means for depressurizing the pump/motor unit from the hydraulic system and a means for depressurizing the second pump/motor unit from the second hydraulic system when both pump/motor unit and the second pump/motor unit are mutually isolated from their respective hydraulic systems.

Also disclosed is a method for transferring power between (a) a hydraulic system in which a pump/motor unit is hydraulically isolated from the hydraulic system and unpressurized and (b) a second hydraulic system in which a second pump/motor unit is hydraulically isolated from the second hydraulic system and unpressurized, comprising the steps of sensing a fluid flow demand in, for example, the second hydraulic system; commanding, when the fluid flow demand in the second hydraulic systems is sensed, a valve means to access the pump/motor unit to the hydraulic system thereby causing the pump/motor unit to commence rotating and function as a motor; driving, with the pump/motor unit, the second pump/motor unit to function as a pump; delaying the opening of a second valve means to access the second pump/motor unit to the second hydraulic system until after the second pump/motor unit is rotating and functioning as a pump with pressure substantially equal to or greater than that of the second hydraulic system; accessing the second pump/motor unit to the second hydraulic system; bypassing flow from the second pump/motor unit, when the second pump/motor unit is functioning as a pump, to achieve smooth fluid flow delivery from the second pump/motor unit to the second hydraulic system as the fluid flow demand in the second hydraulic system decreases to zero; isolating the pump/motor unit from the hydraulic system and isolating the second pump/motor unit from the second hydraulic system, when there is no longer a fluid flow demand in the second hydraulic system; and depressurizing both the pump/motor unit and the second pump/motor unit when both the pump/motor unit and the second pump/motor unit are isolated from the hydraulic system and the second hydraulic system, respectively.

More particularly illustrated is a reversible, variable displacement low breakout power transfer unit utilizing conventional in-line rotating groups with a valve arrangement that senses system fluid flow demand and differential pressure between the hydraulic systems connected to each side of the low breakout power transfer unit. Flow limiter/check valves in both the high pressure system inlet and low pressure system outlet provide fluid flow limiting and fluid flow demand sensing functions, respectively.

The low breakout power transfer unit utilizes internal flow bypassing only to achieve smooth fluid flow delivery at fluid flows below which prior art non-internal flow bypassing power transfer units stall. During the standby state, the fluid flow sensing valves assume a position that checks, or hydraulically isolates, the power transfer unit from both hydraulic systems. Both rotating groups depressurize internally and cease rotating. Therefore, hydraulic fluid flow is not demanded from either hydraulic system during the standby state to support rotation of the rotating groups. The hydraulic power consumption at standby is even less than that which is achievable with prior art non-internal flow bypassing power transfer units, which maintain a constant stall leakage characteristic, because the flow limiter/check valve of each unit acts as a checkvalve to hydraulically isolate the rotating groups from each of their respective hydraulic systems. Once isolated, each rotating group is allowed to depressurize through leakage to case and return.

The rotating groups of the low breakout power transfer unit achieve pressurization and breakout upon command from a shuttle valve which senses differential pressure between the hydraulic systems. The shuttle valve translates and commands the flow limiter/check valve in the higher pressure hydraulic system to act as a flow limiter and commands the flow limiter/check valve in the lower pressure hydraulic system to act as a fluid flow demand sensing valve. Breakout of the rotating groups occurs by commanding open the high pressure side flow limiter/check valve with both rotating groups depressurized. High pressure hydraulic fluid accesses the motor side rotating group creating a driving torque which is unopposed by the pump side since it is depressurized and, hence, unloaded. After the pressure on the pump side exceeds that of the demanding hydraulic system, the flow limiter/check valve opens to permit flow into that system.

Since breakout of the rotating groups is achieved by accessing the high pressure side rotating group to system pressure with the low pressure side rotating group depressurized and unloaded, startup pressure differential is solely a function of shuttle valve pressure differential, and independent of the inherent breakout torque characteristics of the rotating groups when stalled at the working system pressure. The desired startup pressure may be set by correctly sizing the shuttle valve translational differential pressure.

Once the rotating groups are rotating, the low breakout power transfer unit has the capability of providing continuous fluid flow to the low pressure system until fluid flow demand ceases. While prior art non-internal flow bypassing power transfer units stall out at some fluid flow rate greater than zero, the low breakout power transfer unit, by using internal bypassing of pump fluid flow through the periods of low fluid flow demand, achieves smooth fluid flow delivery down to the zero fluid flow condition. The low fluid flow capability of the low breakout power transfer unit is comparable to that of prior art internal bypassing power transfer units.

THE DRAWING

DETAILED DESCRIPTION OF THE INVENTION

Description of the Illustrated Embodiment

Figure 1:
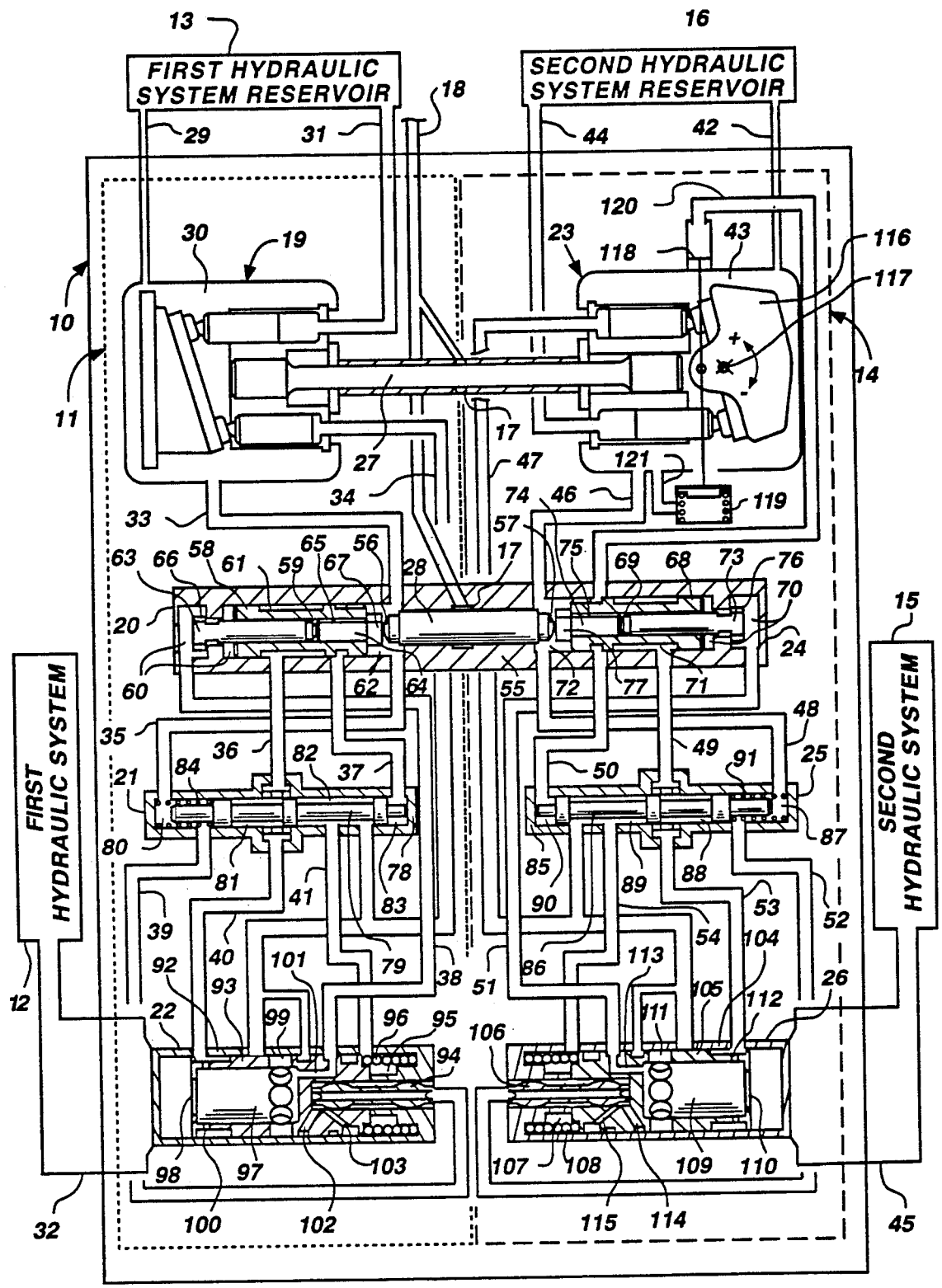
FIG. 1 is a schematic representation of the low breakout power transfer unit in the zero flow or non-rotating state.

Referring to FIG. 1, a reversible variable displacement low breakout power transfer unit 10 (illustrated schematically by the solid line) has a fixed displacement (hereafter referred to as "fixed") pump/motor unit 11 (illustrated schematically by the dotted line), which is connected to a first hydraulic system 12 in which work is performed and spent hydraulic fluid returns to a first hydraulic system reservoir 13 through a first hydraulic return system (not illustrated), and a variable displacement (hereafter referred to as "variable") pump/motor unit 14 (illustrated schematically by the dashed line), which is connected to a second hydraulic system 15 in which work is performed and spent hydraulic fluid returns to a second hydraulic system reservoir 16 through a second hydraulic return system (not illustrated). Fixed pump/motor unit 11 operates exclusively with hydraulic fluid from first hydraulic system 12 and first hydraulic system reservoir 13, and variable pump/motor unit 14 operates exclusively with fluid from second hydraulic system 15 and second hydraulic system reservoir 16. Where physical connections between fixed pump/motor unit 11 and variable pump/motor unit 14 exist, intermixing of hydraulic fluid from first hydraulic system 12 and first hydraulic system reservoir 13 with second hydraulic system 15 and second hydraulic system reservoir 16 is prevented by collection of fluid seepage in collection cavities 17 and drainage of collected fluid seepage from collection cavities 17 through drain passage 18 to waste.

Fixed pump/motor unit 11 comprises a fixed rotating group 19, a fixed side shuttle valve 20, a fixed side mode valve 21 and a fixed side flow limiter/check valve 22. Variable pump/motor unit 14 comprises a variable rotating group 23, a variable side shuttle valve 24, a variable side mode valve 25 and a variable side flow limiter/check valve 26. Fixed rotating group 19 and variable rotating group 23 are connected to each other through common drive shaft 27. Fixed side shuttle valve 20 and variable side shuttle valve 24 are in communication with each other through shuttle pin 28.

Fixed pump/motor unit 11 is connected to first hydraulic system reservoir 13 by reservoir passage 29 which connects to fixed rotating group housing 30. Fixed pump/motor unit 11 is also connected to first hydraulic system reservoir 13 by fixed rotating group inlet passage 31, which connects fixed rotating group 19 to first hydraulic system reservoir 13. Fixed pump/motor 11 connects to first hydraulic system 12 through passage 32, which connects to fixed side flow limiter/check valve 22. Fixed rotating group housing 30 is connected to fixed side shuttle valve 20 through passage 33. Fixed rotating group 19 is connected to fixed side mode valve 21 and fixed side flow limiter/check valve 22 through fixed rotating group output passage 34. Fixed side shuttle valve 20 is connected to fixed side mode valve 21 through passage 35, passage 36 and passage 37 and is connected to fixed side flow limiter/check valve 22 through passage 38. Fixed side mode valve 21 is connected to fixed side flow limiter/check valve 22 through passage 39, passage 40 and passage 41.

Similarly, variable pump/motor unit 14 is connected to second hydraulic system reservoir 16 by reservoir passage 42 which connects to variable rotating group housing 43. Variable pump/motor unit 14 is also connected to second hydraulic system reservoir 16 by variable rotating group outlet passage 44, which connects variable rotating group 23 to second hydraulic system reservoir 16. Variable pump/motor 14 connects to second hydraulic system 15 through passage 45, which connects to variable side flow limiter/check valve 26. Variable rotating group housing 43 is connected to variable side shuttle valve 24 through passage 46. Variable rotating group 23 is connected to variable side mode valve 25 and variable side flow limiter/check valve 26 through variable rotating group input passage 47. Variable side shuttle valve 24 is connected to variable side mode valve 25 through passage 48, passage 49 and passage 50 and is connected to variable side flow limiter/check valve 26 through passage 51. Variable side mode valve 25 is connected to variable side flow limiter/check valve 26 through passage 52, passage 53 and passage 54.

Fixed side shuttle valve 20 and variable side shuttle valve 24 communicate with each other through shuttle pin 28 which is slidably located within common shuttle valve housing 55. Shuttle pin 24 has a fixed side shuttle pin end 56 which communicates fixed side shuttle valve 20 and a variable side shuttle pin end 57 which communicates variable side shuttle valve 24. Fixed side shuttle valve spool 58, having a longitudinal bore 59, is slidably located within fixed side shuttle valve 20 and forms cavity 60, cavity 61 and cavity 62 in fixed side shuttle valve 20 such that cavity 60, cavity 61 and cavity 62 are sealed from each other. Slidably inserted into longitudinal bore 59 are spool pin 63 and spool pin 64. Spool pin 63 seals longitudinal bore 59 and cavity 60 from each other and longitudinal bore 59 and cavity 62 communicate with each other through longitudinal pin passage 65. The left and right portions of cavity 60 communicate with each other through longitudinal passages 66 located in the head of spool pin 63. Head 67 of spool pin 64 communicates with fixed side shuttle pin end 56. Variable side shuttle valve spool 68, having a longitudinal bore 69, is slidably located within variable side shuttle valve 24 and forms cavity 70, cavity 71 and cavity 72 in variable side shuttle valve 24 such that cavity 70, cavity 71 and cavity 72 are sealed from each other. Slidably inserted into longitudinal bore 69 are spool pin 73 and spool pin 74. Spool pin 73 seals longitudinal bore 69 and cavity 70 from each other and longitudinal bore 69 and cavity 72 communicate with each other through longitudinal pin passage 75. The left and right portions of cavity 70 communicate with each other through longitudinal passages 76 located in the head of spool pin 74. Head 77 of spool pin 74 communicates with variable side shuttle pin end 57.

Fixed side mode valve 21 comprises mode valve housing 78 within which is located slidable mode valve spool 79 to form cavity 80, cavity 81, cavity 82, and cavity 83 which are sealed from each other. Within cavity 80 is located a spring 84 which biases mode valve spool 79. Variable side mode valve 25 comprises mode valve housing 85 within which is located slidable mode valve spool 86 to form cavity 87, cavity 88, cavity 89, and cavity 90 which are sealed from each other. Within cavity 87 is located a spring 91 which biases mode valve spool 86.

Fixed side flow limiter/check valve 22 comprises housing 92 which houses piston 93 and transfer tube 94 to form cavity 95. Within cavity 95 is located a spring 96 which biases piston 93 at its base. A chamber 97 which is located within piston 93 communicates with first hydraulic system 12 through an orifice 98 located in the top of piston 93 and passage 32. A metering orifice 99 connected to chamber 97 is located in the side of piston 93. Piston 93 also contains passage 100, passage 101, passage 102 and passage 103 which allow for communication of fluid and pressure to various passages during different phases of operation of fixed side flow limiter/check valve 22.

Variable side flow limiter/check valve 26 comprises housing 104 which houses piston 105 and transfer tube 106 to form cavity 107. Within cavity 107 is located a spring 108 which biases piston 105 at its base. A chamber 109 which is located within piston 105 communicates with second hydraulic system 15 through an orifice 110 located in the top of piston 105 and passage 45.

A metering orifice 111 connected to chamber 109 is located in the side of piston 105. Piston 105 also contains passage 112, passage 113, passage 114 and passage 115 which allow for communication of fluid and pressure to various passages during different phases of operation of variable side flow limiter/check valve 26.

The cylinder displacement of variable rotating group 23 is varied by rocking piston hanger 116 on pivot point 117. Piston hanger 116 is rocked by the translocation of connecting rod 118, which is connected to piston hanger 116 and is biased by spring 119. Connecting rod 118 translates when the pressure in passage 120 is sufficient to create an axial force large enough to overcome spring 119. The axial force required need only overcome the force of spring 119 because passage 121 is always vented to case. When connecting rod 118 is in the spring biased position, the displacement of variable rotating group 23 is less than the displacement of fixed rotating group 19 and when connecting rod 118 is in the translated position, the displacement of variable rotating group 23 is greater than the displacement of fixed rotating group 19. The variable displacement feature is preferable to allow the rotating group which is acting as a motor to have a larger displacement than the rotating group which is acting as a pump, thereby overcoming the combined torque and volumetric efficiency losses of both units.

Operation of the Illustrated Embodiment

A full operational cycle of the low breakout power transfer unit 10 can be described in four stages. The first stage is the zero-flow or standby/depressurized state, the second stage is the breakout state, the third stage is the high flow state, and the fourth stage is the low flow state.

Referring to FIG. 1, the zero-flow or standby/depressurized state is the operating condition in which first hydraulic system 12 and second hydraulic system 15 are at rated pressure and are hydraulically isolated from fixed pump/motor unit 11 and variable pump/motor unit 14, respectively, and fixed rotating group 19 and variable rotating group 23 are not rotating and depressurized. With the rated pressure of first hydraulic system 12 acting on the fixed pump/motor unit 11, such pressure being communicated from first hydraulic system 12 to cavity 60 of fixed side shuttle valve 20 through passage 32, orifice 98, chamber 97 and passage 38, and with the rated pressure of second hydraulic system 15 acting on the variable pump/motor unit 14, such pressure being communicated from hydraulic system 12 to cavity 70 of variable side shuttle valve 24 through passage 45, orifice 110, chamber 109 and passage 51, a force differential of zero exists across shuttle pin 28, positioning shuttle pin 28 in the centered position. It should be noted that in the illustrated embodiment the sizing of the components of fixed side shuttle valve 20 and variable side shuttle valve 24 are equal, which indicates the rated pressure of first hydraulic system 12 and second hydraulic system 15 are equal. Shuttle pin 28 may also be centered when the rated pressure of first hydraulic system 12 and second hydraulic system 15 are unequal by sizing the components of fixed side shuttle valve 20 and variable side shuttle valve 24 relative to each other such that the force differential across shuttle pin 28 is zero.

In the zero flow or standby/depressurized state, fixed side mode valve 21 is in the spring-biased position because the pressure in cavity 83 is relieved to case pressure through passage 37, cavity 62, passage 33, fixed rotating group housing 30 and reservoir passage 29, and variable side mode valve 25 is in the spring-biased position because the pressure in cavity 90 is relieved to case pressure through passage 50, cavity 71, passage 46, fixed rotating group housing 43 and reservoir passage 42. In the spring-biased position, fixed side mode valve 21 and variable side mode valve 24 provide pressure connections which permit fixed side flow limiter/check valve 22 and variable side flow limiter/check valve 26 to act as a check valves. In the closed or "checked" position, fixed side flow limiter/check valve 22 isolates first hydraulic system 12 from fixed side rotating group 19 and variable side flow limiter/check valve 26 isolates second hydraulic system 15 from variable side rotating group 23. The pressure on the high pressure side of fixed rotating group 19 is equivalent to case pressure because fixed rotating group output passage 34 is vented to case through passage 102, transfer tube 94, passage 39, cavity 80, passage 35, cavity 62, passage 33, fixed rotating group housing 30 and reservoir passage 29. The pressure on the high pressure side of variable rotating group 23 is also equivalent to case pressure because variable rotating group outlet passage 44 is vented to case through passage 114, transfer tube 106, passage 52, cavity 87, passage 48, cavity 72, passage 46, variable rotating group housing 43 and reservoir passage 42.

For fixed side flow limiter/check valve 22 and variable side flow limiter/check valve 26 to perform as check valves, the pressure in passage 39 relieves to case pressure by way of cavity 80, passage 35, cavity 62, passage 33, fixed rotating group housing 30 and reservoir passage 29 and the pressure in and passage 52 relieves to case pressure by way of cavity 87, passage 48, cavity 72, passage 46, variable rotating group housing 43 and reservoir passage 42, which causes case pressure to act across the diametral area of transfer tube 94 and transfer tube 106. Therefore, the pressure in cavity 95 and cavity 107 are at case pressure. With rated system pressure acting on the hydraulic system sides of fixed side flow limiter/check valve 22 and variable side flow limiter/check valve 26, a full-scale pressure differential acts across each valve to hold them in the check position.

Figure 2:
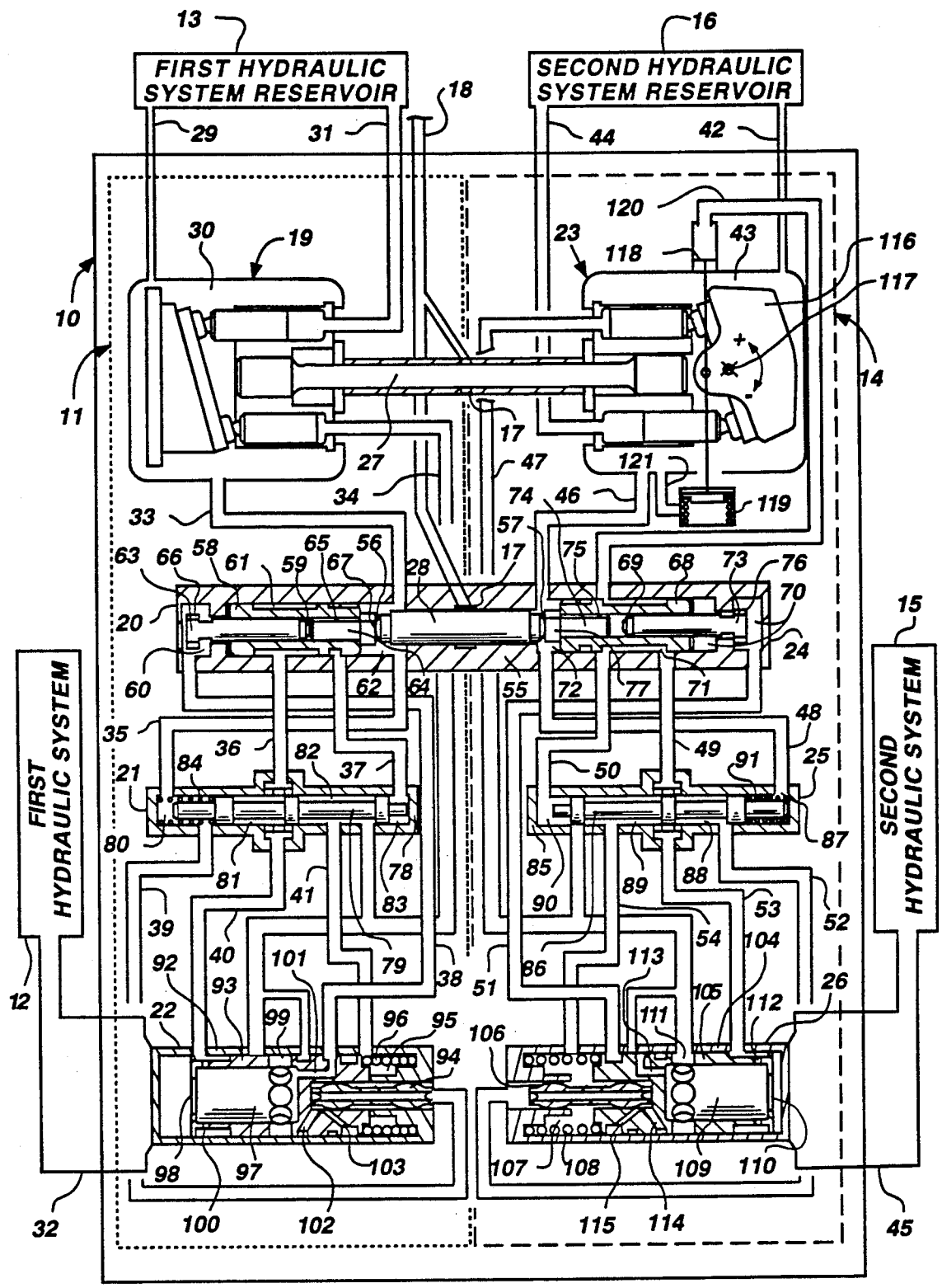
FIG. 2 is a schematic representation of the low breakout power transfer unit in the breakout state.

Referring to FIG. 2, the breakout state is the operating condition in which, for purposes of this illustration, the pressure in first hydraulic system 12 begins to decrease. The decrease in pressure of first hydraulic system 12 is communicated to cavity 60 of fixed side shuttle valve 20 through passage 32, orifice 98, chamber 97, passage 101 and passage 38, and a pressure differential between first hydraulic system 12 and second hydraulic system 15 is sensed between fixed side shuttle valve spool 58 and variable side shuttle valve spool 68. This pressure differential causes spool pin 63, fixed side shuttle valve spool 58, spool pin 64, shuttle pin 28, spool pin 74 and variable side shuttle valve spool 68 to translate to the left. It should be noted that the exact breakout differential at which shuttle pin 28 translates is dependent upon the area difference between fixed side shuttle valve spool 58 and variable side shuttle valve spool 68. Since spool pin 73 is restrained from translating, the area of spool pin 73 is subtracted from the area of variable side shuttle valve spool pin 68. By adjusting the areas between fixed side shuttle valve spool 58 and spool pin 63 and variable side shuttle valve spool 68 and spool pin 73, a desired breakout differential between first hydraulic system 12 and second hydraulic system 15 at which shuttle valve pin 28 translates can be established.

Translated variable side shuttle valve spool 68 ports second hydraulic system 15 rated pressure from cavity 109 of piston 105 into cavity 90 of variable side mode valve 25 through passage 112, passage 53, cavity 88, passage 49, cavity 71 and passage 50. Since the pressure in cavity 87 remains at case pressure, mode valve spool 86 translates to the right against spring 91. When mode valve spool 86 is in the translated position, variable side mode valve 25 is in the "motor position" which provides appropriate porting for pressure connections to variable side flow limiter/check valve 26 to cause it to operate as a flow limiter rather than a check valve.

When variable side mode valve 25 is in the "motor position," appropriate porting is also provided for pressure connections to variable side rotating group 23 to cause it to operate as a motor by having a larger displacement than fixed side rotating group 19. This is accomplished by porting second hydraulic system 15 rated pressure to connecting rod 118 through passage 45, orifice 110, chamber 109, passage 112, passage 53, cavity 86 and cavity 89, passage 49, cavity 71, passage 121 and passage 120. When the pressure in passage 120 is at second hydraulic system 15 rated pressure, which provides a force on connecting rod 43 which overcomes the force of spring 119, connecting rod 118 translates and the displacement of variable rotating group 23 is greater than the displacement of fixed rotating group 19.

As variable side flow limiter/check valve 26 opens, second hydraulic system 15 rated pressure is ported to variable side rotating group 23 through passage 45, orifice 110, chamber 109, metering orifice 111 and passage 47. Since fixed side rotating group 19 is only exposed to case pressure, fixed pump/motor unit 11 is virtually depressurized and unloaded. The introduction of second hydraulic system 15 rated pressure to variable side rotating group 23 will quickly exceed the breakout pressure differential of fixed pump/motor unit 11 in this depressurized and unloaded condition, and variable side rotating group 23 and fixed side rotating group 19 commence to rotate.

As fixed side rotating group 23 commences rotating, pressure increases in fixed rotating group output passage 34. The increasing pressure from fixed side rotating group 23 is ported to cavity 95 of fixed side flow limiter/check valve 22 through fixed rotating group output passage 34, cavity 82 of fixed side mode valve 20 and passage 41. When the increasing pressure in cavity 95 creates a force on the area of piston 97 that exceeds the closure force on piston 97 due to first hydraulic system 12 pressure, which has dropped from first hydraulic system 12 rated pressure due to a flow demand, the pressure differential across piston 97 causes it to translate towards the open or unchecked position in which passage 34 connects with metering orifice 99, thereby porting the increasing pressure in fixed rotating group output passage 34 to first hydraulic system 12 through metering orifice 99 chamber 97, orifice 98 and passage 32.

Figure 3:
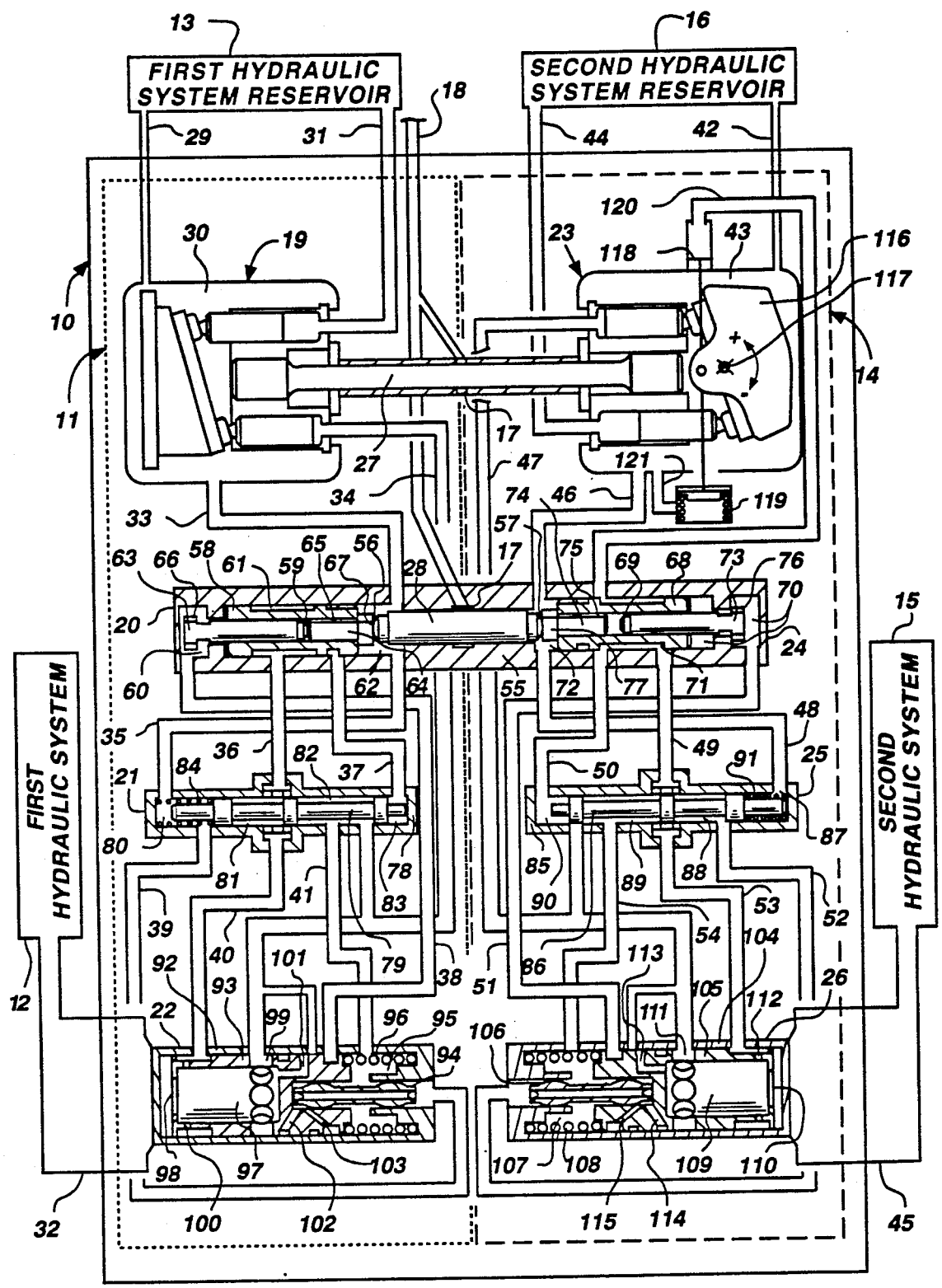
FIG. 3 is a schematic representation of the low breakout power transfer unit in the high flow state.

Referring to FIG. 3, the high flow state is the operating condition in which fixed side flow limiter/check valve 22 functions as a check valve and variable side flow limiter/check valve 26 functions as a flow limiter.

As piston 97 of fixed side flow limiter/check valve 22 continues to translate towards the open or unchecked position, the increasing pressure in fixed rotating group output passage 34 will be cut off from passage 102 and all pump pressure and output flow will be directed to first hydraulic system 12 through fixed rotating group output passage 34, metering orifice 99, chamber 97, orifice 98 and passage 32. As piston 97 translates towards the open or unchecked position, cavity 60 of fixed side shuttle valve 20 is vented to case pressure through passage 38, passage 103, transfer tube 94, passage 39, cavity 80, passage 35, cavity 62, passage 33, fixed rotating group housing 30 and reservoir passage 29. With the pressure in cavity 60 of fixed side shuttle valve 20 vented to case pressure, fixed side shuttle valve 20 is effectively "latched" into the translated position as long as fixed side flow limiter/check valve 22 remains open in response to flow demand in first hydraulic system 12. With fixed side flow limiter/check valve 22 open, output flow from fixed side rotating group 19 supports first hydraulic system 12 flow demand.

Variable side flow limiter/check valve 26 functions as a flow limiter to limit the amount of fluid flow from second hydraulic system 15 to variable rotating group 23. When fixed side shuttle valve 20 is "latched" into the translated position, variable side shuttle valve 24 is translated hardover to the left and second hydraulic system 15 rated pressure is applied to cavity 90 of variable side mode valve 25 through passage 45, orifice 110, chamber 109, passage 112, passage 53, cavity 88 and cavity 89, passage 49, cavity 71 and passage 50. Porting of second hydraulic system 15 rated pressure to cavity 90 of variable side mode valve 25 maintains mode valve spool 86 in the translated or "motor" position, which provides for the communication of the pressure sensed at orifice 110 to cavity 107 of variable side flow limiter/check valve 26 through passage 112, passage 53, cavity 89 of variable side mode valve 25 and passage 54. The pressure sensed at orifice 110 also communicates behind transfer tube 106 through passage 112, passage 53, cavity 88, passage 52 and transfer tube 106. Since all areas on the bottom of piston 105 are exposed to the pressure sensed at orifice 110, the pressure differential across piston 105 is equal to the pressure differential across orifice 110. As hydraulic fluid flow from second hydraulic system 15 into the variable rotating group 23 increases, the differential pressure across orifice 110 increases, nd the net force acting against spring 108 increases. If the flow is high enough, the net force due to the differential pressure that is developed across piston 105 overcomes the force of spring 108 and translates piston 105 towards the closed or "checked" position, and metering orifice 111 closes to limit the hydraulic fluid flow into variable rotating group 23.

Figure 4:
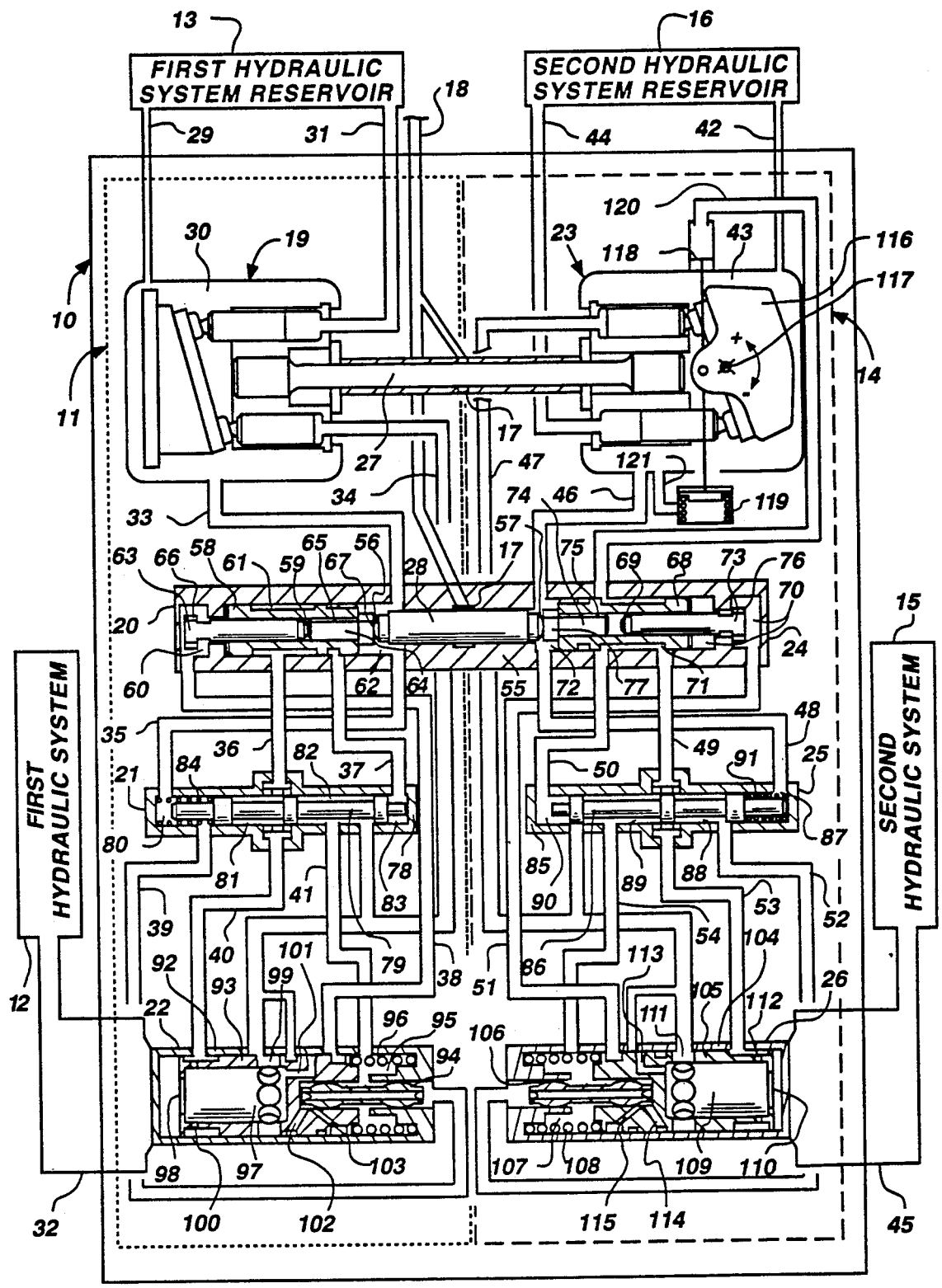
FIG. 4 is a schematic representation of the low breakout power transfer unit in the low flow state.

Referring to FIG. 4, the low flow state is the operating condition in which there is smooth flow delivery into first hydraulic system 12 as the flow demand ceases.

Referring to fixed pump/motor unit 11, as first hydraulic system 12 flow demand decreases, the differential pressure across metering orifice 99 of fixed side flow limiter/check valve 22 decreases, and piston 93 translates towards the closed or "checked" position. Prior to metering orifice 99 closing completely, a portion of the flow from fixed rotating group output passage 34 ports to first hydraulic system reservoir 13 through passage 102, transfer tube 94, passage 39, cavity 80, passage 35, cavity 62, passage 33, fixed rotating group housing 30 and reservoir passage 29. The porting of a portion of the flow from fixed rotating group output passage 34 to first hydraulic system reservoir 13 allows fixed pump/motor unit 11 to maintain rotation and smooth hydraulic fluid flow delivery into first hydraulic system 12 until the flow demand ceases.

When the flow demand in first hydraulic system 12 ceases entirely, piston 93 translates to the completely closed or "checked" position, metering orifice 99 is closed, passage 101 connects to passage 38, first hydraulic system 12 pressure is ported to cavity 60 of fixed side shuttle valve 20 through passage 101 and passage 38, and the "latch" of fixed side shuttle valve 20 is broken, allowing spool pin 63, fixed side shuttle valve spool 58, spool pin 64, shuttle pin 28, spool pin 74 and variable side shuttle valve spool 68 to "unlatch" and translate back to their original centered position.

Referring to variable pump/motor unit 14, the return of variable side shuttle valve spool 68 to the centered position ports cavity 90 to case pressure through passage 50, cavity 72, passage 46, variable rotating group housing 43 and reservoir passage 42, and mode valve spool 86 returns to the spring-biased position. When mode valve spool 86 is in the spring-biased position, case pressure is applied to transfer tube 106 through passage 52, cavity 87, passage 48, cavity 72, passage 46, variable rotating group housing 43 and reservoir passage 42, and piston 105 returns to the completely closed or "checked" position.

The operational sequence of low breakout power transfer unit 10 has now returned to the first stage zero flow or standby/depressurized state illustrated in FIG. 1, as both fixed side flow limiter/check valve 22 and variable side flow limiter/check valve 26 are now in the closed or checked position and both fixed pump/motor unit 11 and variable pump/motor unit 14 are isolated from first hydraulic system 12 pressure and second hydraulic system 15 pressure, respectively. The pressure between the variable rotating group 23 and variable side flow limiter/check valve 26 quickly bleeds to case pressure because passage 47 is ported to second hydraulic system reservoir 16 through passage 114, transfer tube 106, passage 52, cavity 87, passage 48, cavity 72, passage 46, variable rotating group housing 43 and reservoir passage 42. Likewise, the pressure between the fixed rotating group 19 and fixed side flow limiter/check valve 22 quickly bleeds to case pressure because passage 34 is ported to first hydraulic system reservoir 13 through passage 102, transfer tube 94, passage 39, cavity 80, passage 35, cavity 62, passage 33, variable rotating group housing 30 and reservoir passage 29.

Whereas the invention is here illustrated and described with specific reference to an embodiment thereof presently contemplated as the best mode in carrying out such invention, it is to be understood that various changes may be made in adapting the invention to different embodiments without departing from the broad inventive of concepts disclosed herein and comprehended by the claims that follow.

We claim:

1. A power transfer unit for transferring power between two hydraulic systems, comprising:
   (a) a first pump/motor unit that is associated with a first hydraulic system to allow fluid flow between the pump/motor unit and the first hydraulic system;
   b) a second pump/motor unit that is associated with a second hydraulic system to allow fluid flow between the second pump/motor unit and the second hydraulic system, the second pump/motor unit being driveably connected to the first pump/motor unit;

c) a detection means for sensing a fluid flow demand in the first hydraulic system and the second hydraulic system;

d) a first valve means for isolating the first pump/motor unit from the first hydraulic system automatically when the detection means senses substantially no fluid flow demand in the first hydraulic system and a second valve means for isolating the second pump/motor unit from the second hydraulic system automatically when the detection means senses substantially no fluid flow demand in the second hydraulic system;

e) a mode means for commanding, when the detection means senses a flow demand in the second hydraulic system, the first valve means to access the first pump/motor unit to the first hydraulic system thereby causing the first pump/motor unit to commence rotating and function as a motor to drive the second pump/motor unit as a pump;

f) a delay means for delaying the opening of the second valve means to access the second pump/motor unit to the second hydraulic system until after the second pump/motor unit is rotating and functioning as a pump with pressure substantially equal to or greater than the fluid pressure in the second hydraulic system; and g) a bypass means for bypassing flow from the second pump/motor unit, when the second pump/motor unit is functioning as a pump, to achieve smooth fluid flow delivery from the second pump/motor unit to the second hydraulic system as the fluid flow demand to the second hydraulic system decreases below the fluid flow demand at which the power transfer unit would cease rotating smoothly in the absence of such bypass pass flow, and until the fluid flow demand decreases to zero.

2. A power transfer unit for transferring power between two hydraulic systems as recited in claim 1, wherein the power transfer unit is reversible.

3. A power transfer unit for transferring power between two hydraulic systems as recited in claim 1, wherein the first pump/motor unit's displacement is variable.

4. A power transfer unit for transferring power between two hydraulic systems as recited in claim 1, wherein the first pump/motor unit's displacement and the second pump/motor unit's displacement are variable.

5. A power transfer unit for transferring power between two hydraulic systems as recited in claim 1, further comprising a means for depressurizing the first pump/motor unit and a means for depressurizing the second pump/motor unit when both the first pump/motor unit and the second pump/motor unit are mutually isolated from the first hydraulic system and the second hydraulic system, respectively.

6. A power transfer unit for transferring power between two hydraulic systems as recited in claim 2, wherein the first pump/motor unit's displacement is variable.

7. A power transfer unit for transferring power between two hydraulic systems as recited in claim 2, wherein the first pump/motor unit's displacement and the second pump/motor unit's displacement are variable.

8. A power transfer unit for transferring power between two hydraulic systems as recited in claim 2, further comprising a means for depressurizing the first pump/motor unit and a means for depressurizing the second pump/motor unit when both the pump/motor unit and the second pump/motor unit are mutually isolated from the first hydraulic system and the second hydraulic system, respectively.

9. A power transfer unit for transferring power between two hydraulic systems as recited in claim 3, further comprising a means for depressurizing the first pump/motor unit and a means for depressurizing the second pump/motor unit when both the first pump/motor unit and the second pump/motor unit are mutually isolated from the first hydraulic system and the second hydraulic system, respectively.

10. A power transfer unit for transferring power between two hydraulic systems as recited in claim 4, further comprising a means for depressurizing the first pump/motor unit and a means for depressurizing the second pump/motor unit when both the first pump/motor unit and the second pump/motor unit are mutually isolated from the first hydraulic system and the second hydraulic system, respectively.

11. A power transfer unit for transferring power between two hydraulic systems as recited in claim 6, further comprising a means for depressurizing the first pump/motor unit and a means for depressurizing the second pump/motor unit from the second hydraulic system when both the first pump/motor unit and the second pump/motor unit are mutually isolated from the first hydraulic system and the second hydraulic system, respectively.

12. A power transfer unit for transferring power between two hydraulic systems as recited in claim 7, further comprising a means for depressurizing the first pump/motor unit and a means for depressurizing the second pump/motor unit when both the first pump/motor unit and the second pump/motor unit are mutually isolated from the first hydraulic system and the second hydraulic system, respectively.

13. A power transfer unit for transferring power between two hydraulic systems, comprising:

a) a first pump/motor unit that is associated with a first hydraulic system to allow fluid flow between the first pump/motor unit and the first hydraulic system;

b) a second pump/motor unit that is associated with a second hydraulic system to allow fluid flow between the second pump/motor unit and the second hydraulic system, the second pump/motor unit being driveably connected to the first pump/motor unit;

c) a shuttle valve, for sensing a differential pressure between the first hydraulic system and second hydraulic system which is different than a preset differential pressure;

d) a flow limiter/check valve means, intercooperated with said shuttle valve for automatically isolating the first pump/motor unit from the first hydraulic system and a second flow limiter/check valve means, intercooperated with said shuttle valve for automatically isolating the second pump/motor unit from the second hydraulic system, when the shuttle valve senses a differential pressure which is substantially the same as the preset differential pressure;

e) the shuttle valve, when sensing a differential pressure which is different than the preset differential pressure because of a flow demand in the second hydraulic system, commanding (i) the flow limiter/check valve means to act as a flow limiter and access the first pump/motor unit to the first hydraulic system thereby causing the first pump/motor unit to commence rotating and function as a motor to drive the second pump/motor unit as a pump and (ii) the second flow limiter/check valve means to act as a fluid flow demand sensing valve;

f) a delay means for delaying the opening of the second flow limiter/check valve to access the second pump/motor unit to the second hydraulic system until after the second pump/motor unit is rotating and functioning as a pump with pressure substantially equal to or greater than the fluid pressure in the second hydraulic system;

g) a bypass means for bypassing flow from the second pump/motor unit, when the second pump/motor unit is functioning as a pump, to achieve smooth fluid flow delivery from the second pump/motor unit to the second hydraulic system as the fluid flow demand to the second hydraulic system decreases to zero; and h) a means for depressurizing the first pump/motor unit and a means for depressurizing the second pump/motor unit when both the first pump/motor unit and the second pump/motor unit are mutually isolated from the first hydraulic system by the flow limiter/check valve means and the second hydraulic system by the second flow limiter/check valve means, respectively.

14. A power transfer unit for transferring power between two hydraulic systems as recited in claim 13, wherein the power transfer unit is reversible.

15. A power transfer unit for transferring power between two hydraulic systems as recited in claim 14, wherein the first pump/motor unit's displacement is variable.

16. A power transfer unit for transferring power between two hydraulic systems as recited in claim 15, wherein the second pump/motor unit's displacement is variable.

17. A method for transferring power between a first hydraulic system in which a first pump/motor unit is hydraulically isolated from the first hydraulic system and unpressurized and a second hydraulic system in which a second pump/motor unit is hydraulically isolated from the second hydraulic system and unpressurized, comprising:

a) sensing a fluid flow demand to the second hydraulic system;

b) commanding, when the fluid flow demand to the second hydraulic system is sensed, a valve means to access the first pump/motor unit to the first hydraulic system thereby causing the first pump/motor unit to commence rotating and function as a motor;

c) driving, with the first pump/motor unit, the second pump/motor unit to function as a pump;

d) delaying the opening of a second valve means to access the second pump/motor unit to the second hydraulic system until after the second pump/motor unit is rotating and functioning as a pump with fluid pressure substantially equal to or greater than the fluid pressure in the second hydraulic system;

e) accessing the second pump/motor unit to the second hydraulic system;

f) bypassing flow from the second pump/motor unit, when the second pump/motor unit is functioning as a pump, to achieve smooth fluid flow delivery from the second pump/motor unit to the second hydraulic system as the fluid flow demand in the second hydraulic system decreases to zero;

g) automatically isolating the first pump/motor unit from the first hydraulic system and automatically isolating the second pump/motor unit from the second hydraulic system, when the fluid flow demand in the second hydraulic system is zero;

h) depressurizing both the first pump/motor unit and the second pump/motor unit when both the first pump/motor unit and the second pump/motor unit are isolated from the first hydraulic system and the second hydraulic system, respectively.

* * * * *